(12) United States Patent
Damgaard et al.

(10) Patent No.: US 11,549,491 B2
(45) Date of Patent: Jan. 10, 2023

(54) INDEPENDENT MONITORING SYSTEM FOR A WIND TURBINE

(71) Applicant: KK WIND SOLUTIONS A/S, Ikast (DK)

(72) Inventors: Chris Damgaard, Herning (DK); Per Bisgaard, Tim (DK)

(73) Assignee: KK WIND SOLUTIONS A/S, Ikast (DK)

( * ) Notice: Subject to any disclaimer, the term of this patent is extended or adjusted under 35 U.S.C. 154(b) by 407 days.

(21) Appl. No.: 16/618,963

(22) PCT Filed: Jun. 12, 2018

(86) PCT No.: PCT/DK2018/050132
§ 371 (c)(1),
(2) Date: Dec. 3, 2019

(87) PCT Pub. No.: WO2018/228648
PCT Pub. Date: Dec. 20, 2018

(65) Prior Publication Data
US 2020/0141392 A1 May 7, 2020

(30) Foreign Application Priority Data

Jun. 14, 2017 (DK) .......................... PA 2017 70459

(51) Int. Cl.
*F03D 17/00* (2016.01)
*F03D 7/04* (2006.01)

(52) U.S. Cl.
CPC ............... *F03D 17/00* (2016.05); *F03D 7/04* (2013.01); *F05B 2260/80* (2013.01); *F05B 2260/82* (2013.01)

(58) Field of Classification Search
CPC . F03D 17/00; F03D 7/04; F03D 80/40; F05B 2260/80; F05B 2260/82;
(Continued)

(56) References Cited

U.S. PATENT DOCUMENTS

2011/0020122 A1 1/2011 Parthasarathy et al.
2012/0029892 A1 2/2012 Thulke
(Continued)

FOREIGN PATENT DOCUMENTS

CN 104520578 A * 4/2015 ............. F16C 19/52
CN 103604622 B * 2/2016
(Continued)

OTHER PUBLICATIONS

Vittal et al., U.S. Patent Application Publication 2012/0053983, Mar. 2012, see the shortened version.*
(Continued)

*Primary Examiner* — Kandasamy Thangavelu
(74) *Attorney, Agent, or Firm* — Pearne & Gordon LLP

(57) ABSTRACT

The invention relates to a system for monitoring wind turbine components including an independent data processing environment adapted to: receive a first category of data input related to operation of the wind turbine, process the received data input by one or more component specific monitoring algorithms adapted to establish an estimated component value related to a component to be monitored based on received first category data input having at least indirectly impact on the component, wherein the component specific monitoring algorithm is adapted to establish a component residual as the difference between the estimated component value and received first category of data input of the component to be monitored, and wherein the component specific monitoring algorithm furthermore is adapted to establish a component specific health value of the component to be monitored based on the established residual and put the health value at disposal for data processors outside the environment.

18 Claims, 6 Drawing Sheets

Figure 1:
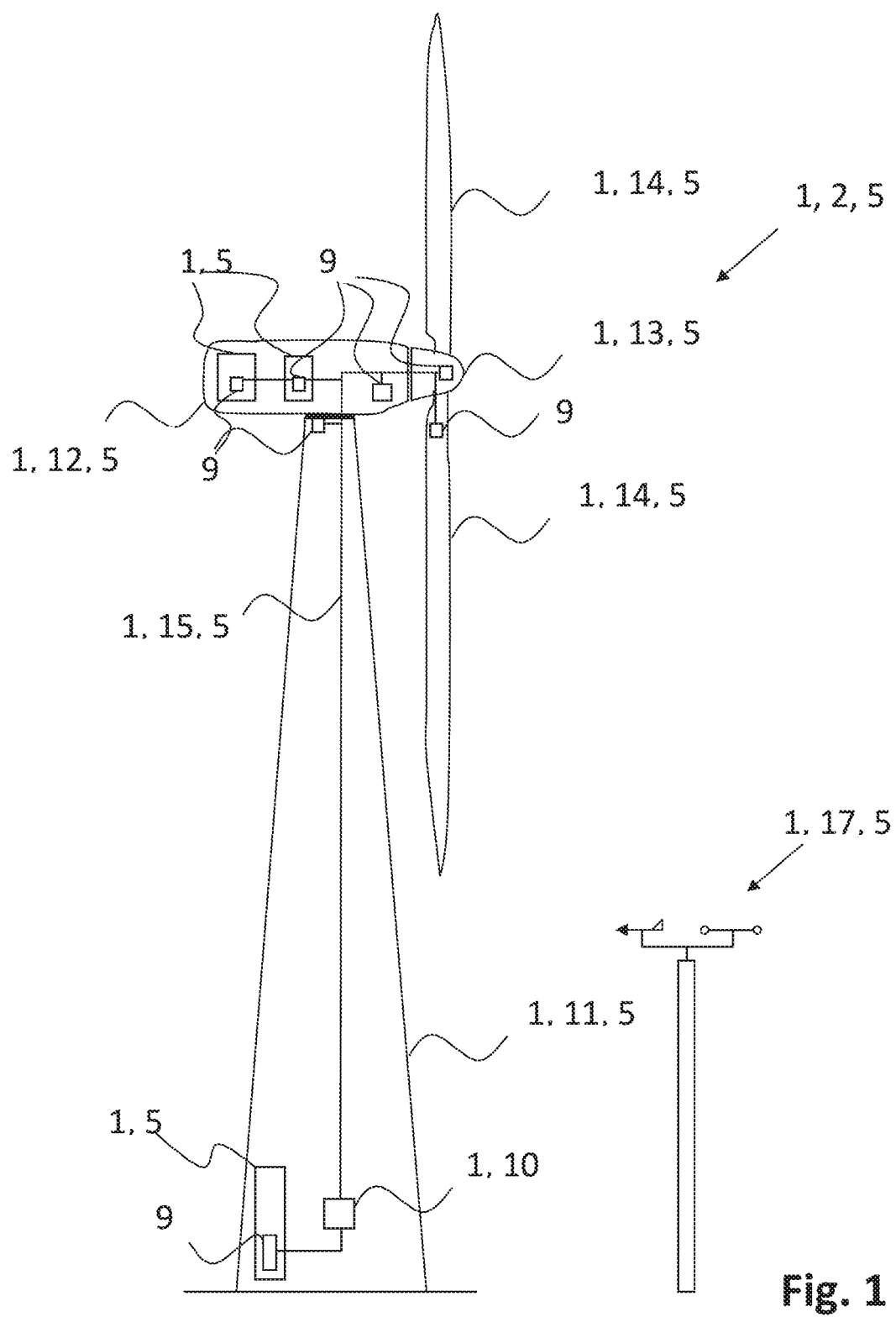

(58) Field of Classification Search
CPC ...... Y02E 10/72; F16C 19/52; G01M 13/021; G01M 13/023; G06Q 50/06; G16Z 99/00
See application file for complete search history.

(56) References Cited

U.S. PATENT DOCUMENTS

| | | | |
|---|---|---|---|
| 2012/0053983 A1* | 3/2012 | Vittal | G06Q 50/06 |
| | | | 705/7.28 |
| 2012/0143565 A1 | 6/2012 | Graham, III et al. | |
| 2012/0191439 A1 | 7/2012 | Meagher et al. | |
| 2012/0203704 A1 | 8/2012 | Nakamura et al. | |
| 2017/0138922 A1* | 5/2017 | Potyrailo | G01M 13/021 |

FOREIGN PATENT DOCUMENTS

| | | | | |
|---|---|---|---|---|
| CN | 104018988 B | * | 7/2016 | ............. Y02E 10/72 |
| CN | 106446540 A | * | 2/2017 | ............. G16Z 99/00 |
| CN | 106525415 A | * | 3/2017 | ......... G01M 13/023 |
| DK | 2014-00743 A1 | | 4/2016 | |
| EP | 2 477 086 A1 | | 7/2012 | |
| EP | 2 525 087 A2 | | 11/2012 | |
| WO | WO 2006012827 A1 | * | 2/2006 | ............. F03D 80/40 |

OTHER PUBLICATIONS

Potyrailo et al., U.S. Patent Application Publication 2017/0138922, May 2017, see the shortened version.*
International Search Report Issued in Patent Application No. PCT/DK2018/050132 dated Sep. 19, 2018.
Written Opinion Issued in Patent Application No. PCT/DK2018/050132 dated Sep. 19, 2018.

* cited by examiner

INDEPENDENT MONITORING SYSTEM FOR A WIND TURBINE

FIELD OF THE INVENTION

The invention relates to a system and method of establishing a health value of a component of a wind turbine.

BACKGROUND OF THE INVENTION

Monitoring and predictive maintenance of wind turbine components has been of high interest in the resent years. One known way of monitoring wind turbine components is described in the DK178505 which describes a model based monitoring system. The residual described in DK178505 can be linked to component health and hence used in the control of the wind turbine.

SCADA systems are well known in the art for monitoring wind turbines. Known SCADA systems are all based on threshold values. Hence, if a threshold value is exceeded an elements changes status and a person has to interpret the change and determine how to react.

BRIEF DESCRIPTION OF THE INVENTION

The present invention relates to a monitoring system facilitating this interpretation automatically and thereby increases the overview of larges monitoring systems as well as ensuring a uniform interpretation of monitoring results.

The invention relates to a system for monitoring of wind turbine components, the system comprises an independent data processing environment adapted to: receive by an environment data interface 2 a first category of data input, wherein the first category of data input is related to operation of the wind turbine, process the received data input by one or more component specific monitoring algorithms wherein the component specific monitoring algorithm is adapted to establish an estimated component value related to a component to be monitored based on received first category data input having at least indirectly impact on the component 4, wherein the component specific monitoring algorithm is adapted to establish a component residual as the difference between the estimated component value and received first category of data input of the component to be monitored, and wherein the component specific monitoring algorithm furthermore is adapted to establish a component specific health value of the component to be monitored based on the established residual, by the environment data interface put the health value at disposal for data processors outside the environment.

The data processors to which the health value (or health status or residual) is put at disposal may be related to control of the wind turbine, monitoring system and/or data storage systems.

A wind turbine component is understood as an individual component, a group of components or a subset of components constituting what can be referred to as a subsystem. Wind turbine components can be/be part of e.g. pitch system, converter, gear, generator, hydraulic system, bearings, transformer, power performance, etc.

The independent data processing environment preferably always comprise a data interface facilitating receiving and transmitting data to and from the independent data processing environment. Further, the data interface may facilitate manipulation of the received data such as averaging, filtering, etc. before it is provided to the component specific monitoring algorithm(s) which is/are also part of the independent data processing environment.

The first category of data input is ultimately received from sensors located in/at the wind turbine and monitoring components of the wind turbine during operation hereof. Alternatively, first category data input can also be received from existing monitoring systems, wind turbine controllers, etc. The data input can be raw input or processed input data such as a digital representation of an analogue value, average value, filtered values, etc.

No matter from where the first category data input is received the data typically relates to operation of the wind turbine more specific measurements of temperature, pressure, vibrations, torque, angles, etc. of wind turbine components. The wind turbine is in operation when it is in power production mode or ready to produce power. With this said, the first category data input may also be received from a wind turbine that is not released for production i.e. under or after stop of the wind turbine.

A component specific monitoring algorithm is designed to monitor a particular component. Hence based on the received data input (data having impact on the component and data from the component) a component can be monitored both directly and indirectly.

The difference between the direct and indirect monitoring is referred to as a residual. The size of the residual can be used to determine if a component is healthy or not i.e. the health value. If the residual is large it may indicate that a component or sensor is faulty and if the residual is small, it may indicate that a component and/or sensor is not faulty. It should be mentioned that a temperature residual of 5° C. measured on two components does not necessary lead to the same health value. This is because different components have different temperature operation ranges, are more or less vulnerable to temperature changes, etc.

When the health value is in a first range it corresponds to a first health status, when the health value is in a second range it corresponds to a second health status, etc.

The health value is advantages in that the service team interface is uniform for all systems and components hence a service team only need to be able to deduce one type or series of "code signals" such as colours to determine status of a component or system.

It should be mentioned that the present invention can be implemented in a wind turbine, a plurality of wind turbines or on wind park level.

According to an embodiment of the invention, the environment data interface furthermore is adapted to receive second category of data input, wherein the second category of data input is related to a failure rate of the wind turbine component to be monitored, and wherein the component specific monitoring algorithm furthermore is adapted to update the component specific health value based on the received second category of data input and the present health value.

The failure rate is preferably a percentage also referred to as probability of failure. The failure rate is naturally closely linked to operation and environment in/of the wind turbine. Hence when a percentage failure rate is mentioned, a reference is made to the probability of failure of the component under present operation/environment conditions. The failure rate can be made for any period of time, so a failure rate for the next 1-3 years is lower than for the subsequent 4-7 years. Typically, the failure rate refers to failure of the component under present conditions within the next 1-5 years.

The failure rate is advantage to use in relation to component monitoring in that it is based on real historic data related to the component to be monitored. The historic data origins from information gathered when e.g. a service team is servicing including replacing components of the wind turbine, a component is returned with a warranty claim, etc.

Further, if possible the direct (often a mechanical) defect causing the component to fail is stored with operation data of the wind turbine. Such operation data can be both going back in time from the date of failure or service, but could also only go back a short time it is found that the specific incident caused the component to fail. In this way, it is possible to better predict a potential fault at a wind turbine in operation in that a certain pattern in measurements similar to what previously has caused a component to fail is observed. In such situation, the first category of data input may not indicate anything of particular relevance, but the failure rate/second category of data input may be weighted higher and thereby the health value can say to be determined based on the second category of data input.

According to an embodiment of the invention, the weight of the second category of data input is dynamic so that if a pattern in the received first category of data input is recognised as a pattern that has previously lead to derate or shut down of a wind turbine the health value is determined solely based on the second category of data input.

This is advantageous in that when the data of the database forming basis for the second category of data input is used in comparison with first category of data input similarities, patterns, peak values, etc. can be used as indicators for health status of the component to be monitored. Hence if any of this indicate high risk of failure within near future, the second category of input data is preferably weighted high i.e. overruling first category of data input and thereby determining the health value and thereby at least indirectly the following consequence of the future control of the wind turbine.

According to an embodiment of the invention, the component specific health value is determined solely by the second category of data input if from the second category of data input it is estimated that based on comparison with the first category of data input, the failure rate of the component to be monitored is 50%, preferably 75% or above.

The failure rate may overrule the monitored values if from the data behind the failure rate it can be estimated that the components is soon going to fail or at least that there is a risk of a soon failure (soon may be within 1 year, a period of 1-3 years of other periods. A long period/soon failure may differ from component to component). The exact threshold for updating/overruling depends on the component, the type of failure and the consequences of a failure.

According to an embodiment of the invention, the component monitoring specific algorithm comprises a component specific residual scale established based on simulations of the component to be monitored or based on historic data acquired relating to the component to be monitored.

To be able to convert the residual to a health value, a residual scale has turned out to be valuable. The residual scale is component specific and may even be adjusted according to age or wear of the component. The residual scale may be established by simulations made on the component to determine the relationship between residual and failure of the component. Alternatively, or in addition hereto, the residual scale may be established based on historic data if such are present. Historic data is advantages if data of the specific component and preferably also configuration and environment in which it is located is available in that under these circumstances the actual relationship between residual and failure of the component is derivable. Of course, the more data available, the more reliable the data is.

The component specific residual scale is component dependent in that a residual cannot be considered as generic for all components. This is because the range of allowed operation temperature, pressure, vibration, etc. varies from component to component. Accordingly, if the range is narrow a small residual is more significant than the same residual on a broad range.

According to an embodiment of the invention, the component specific health value is established by comparing the residual to the component specific residual scale.

The residual scales of the component specific monitoring algorithms are aligned to compensate for the abovementioned differences among the components. Hence a residual of 5° C. in one algorithm may give the same health value as a residual of 15° C. in another algorithm. In this way, the health values of the different component can be compared directly by health value and thereby the health value becomes an aligned measure of health status comparable over all components monitored by the present invention.

Hence, the relationship between residual and failure or health of the component is expressed as a health value.

According to an embodiment of the invention, the component specific health value is decreased if the residual changes between a plurality of subsequent samples of the algorithms.

It is advantageous to look at the gradient of the residual established by a number (at least 2-5 samples) of subsequent samples in that a changing gradient indicated that a failure of a component is becoming more and more serious. Therefore, this has to be reflected by the health value to be able to alert e.g. the service team e.g. by shifting health status to RED/ERROR.

According to an embodiment of the invention, the health value of the component is converted to a health status of the component wherein the health status is established based on a plurality of sub-range in the range of possible health values.

Preferably the health value is in a range between 0 and 100, but could be between any range. Preferably the range is divided in three sub-ranges, but could be any number of sub-ranges. In case the range is divided in three sub-ranges the numeric value of the health value may categorise the health status of the component as GOOD, OK and BAD, RED, YELLOW and GREEN, ERROR, WARNING and OK or the like.

Based on the aligned health values, the health status derived from these health values are also aligned. This is advantages in that the same colour displayed on a monitor indicates the same level of health (such as error, warning or ok)

According to an embodiment of the invention, the health value is a value in the range between X-X and X/1, wherein immediate action is required if the health value is in the sub-range of X-X and X/4, wherein action is required if the health value is in the sub-range of X/4 and X/2, and wherein no action is required if the health value is in the sub-range of X/2 and X/1. It should be mentioned that the number of subranges and border values can be changed as desired by the use of the system. Hence from 0 to X sub-ranges or even more can be defined however, three is the intuitive and preferred number to be able to differentiate between do nothing, do something soon and do something now which are the main information relevant to get e.g. for a service team or a wind turbine controller.

According to an embodiment of the invention, the independent data processing environment is operateable parallel to and independent of existing monitoring and control systems of the wind turbine.

This is advantageous in that it is easy to implement also after commissioning of the wind turbine. It can be implemented without interference with the existing control and monitoring systems. The independent data processing environment can replace any existing monitoring system in that due to its independency it can be configured to communicated with any kind of wind turbine and existing systems hereof. With this said it is preferred and to benefit the most from the independent processing environment that it is communicating i.e. sending and/or at least receiving data from existing sensors of existing monitoring and control systems. With this said, it is possible to install sensors the only function of which is to provide information to the data processing environment.

According to an embodiment of the invention, the independent data processing environment is a cloud based environment.

This is advantageous in that it can be located on a cloud server or any serve or, computer located in the wind turbine, wind park or external hereto.

According to an embodiment of the invention, algorithms of the environment data interface 2 and the component specific monitoring algorithms are executed by the same data processor. Advantageously the independent data processing environment is implemented as individual software modules executable by a data processor. This is also advantageous in that it makes the nature of the independent data processing environment dynamic allowing easy addition of new monitoring algorithms monitoring new components.

According to an embodiment of the invention, the environment data interface facilitates communication of the health value, health status or alarms established based on the health value to a data receiver external to the independent data processing environment.

Data receivers can be servers, mobile devices such as smartphones, computers, display screens, etc.

The communication of an alarm can be made if the health status is BAD or RED as exemplified above. The alarm is preferably communicated to a service team or wind turbine owner which then can take appropriate action. But also other YELLOW and GREEN health statuses is preferably communicated to external data processors.

According to an embodiment of the invention, the environment data interface facilitates providing control input to the wind turbine controller dependent on the health status. This is advantageous in that if the wind turbine is difficult to access such as an offshore wind turbine. The controller can regulate the control parameter to a less aggressive (and then less power producing) operation mode and thereby keep producing until service is possible. The level of aggressive mode of operation can by the wind turbine controller be determined by the health status i.e. in case of BAD or RED production stop may be initiated to protect the wind turbine and in case OK or YELLOW reduce production mode may be initiated.

According to an embodiment of the invention, the environment data interface facilitates providing health status to a service team monitor.

This is advantageous in that then a quick overview of the health status of a plurality of wind turbines can be achieved by looking at a screed for yellow or red marked elements indication service is required or should be planned.

This is advantageous over known monitoring systems such as SCADA systems where the service team has to consider e.g. a temperature alarm when it increases above a threshold value. The interpretation of the important of this alarm is in known systems up to the service team where according to the present invention, the monitoring algorithms are performing this interpretation. Accordingly, only thing left for the service team is to react on the yellow or red colours.

According to an embodiment of the invention, the first category of data input is received from existing sensors of the wind turbine or from retrofitted sensors.

Retrofitted sensors could be IOT sensors installed to provide first category input data which is not possible to obtain from existing sensors of the wind turbine.

According to an embodiment of the invention, one or more data input of the first category of data input can be used as basis for establishing one other data input of the first category of data input.

Measurements from sensors measuring components or environment having impact on a particular component can be used to estimate the validity of a measurement from a sensor of that particular component.

According to an embodiment of the invention, second category of data input is obtained from a data based located on an external data storage.

External data storage could e.g. be a server or a cloud server, but could also be part of or related to the independent data processing environment Moreover, the invention relates to a method of establishing a health value for a specific wind turbine component, the method comprising the steps of:

by an independent data processing environment receive from an environment data interface hereof, a first category of data input related to operation of the wind turbine, and process the received data input by one or more component specific monitoring algorithms. Wherein the component specific monitoring algorithm: establishes an estimated component value related to the component based on received first category data input having at least indirectly impact on the component, establishes a component residual as the difference between the estimated component value and received first category of data input of the component, and wherein the component specific monitoring algorithm is characterised in that it establishes a component specific health value of the component based on the established residual.

This is advantageous in that it has the effect, that health status of a component can be established without monitoring the component directly. Hence monitoring of parameters indirectly or directly having influence on the component and knowledge of an expected value of the component, a health value of the component can be established.

According to an embodiment of the invention, the health value is put the at disposal for data processors outside the independent data processing environment by the environment data interface.

According to an embodiment of the invention, the environment data interface furthermore receives second category of data input related to a failure rate of the wind turbine component, and wherein the component specific monitoring algorithm updates the component specific health value based on the received second category of data input and the present health value.

This is advantageous in that the health value of the component can be established based on knowledge from past service or warranty claims of the component i.e. in case history shows many failing components, the health value of the component may be reduced based on this knowledge.

FIGURES

Figure 2:
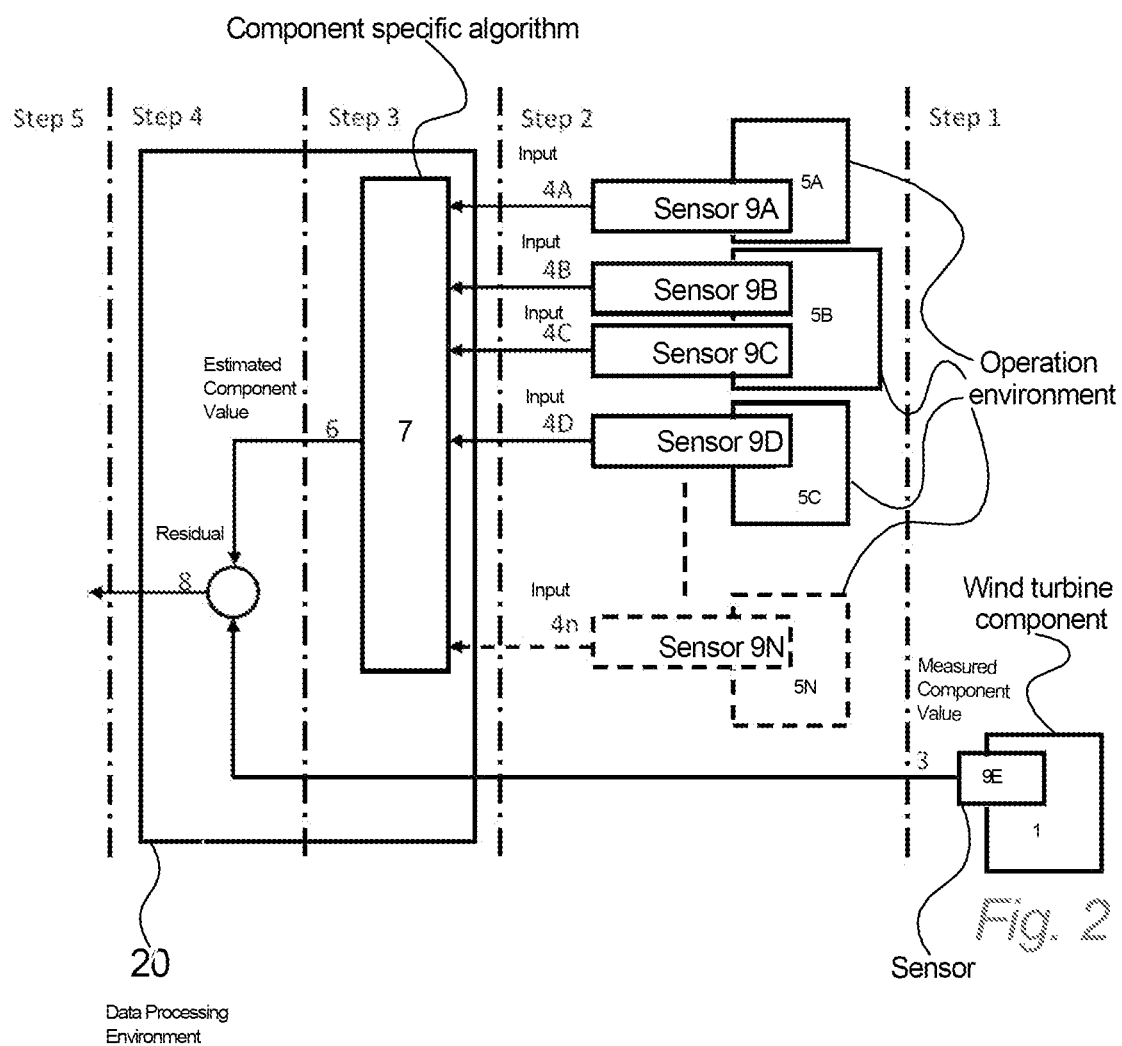
Figure 3:
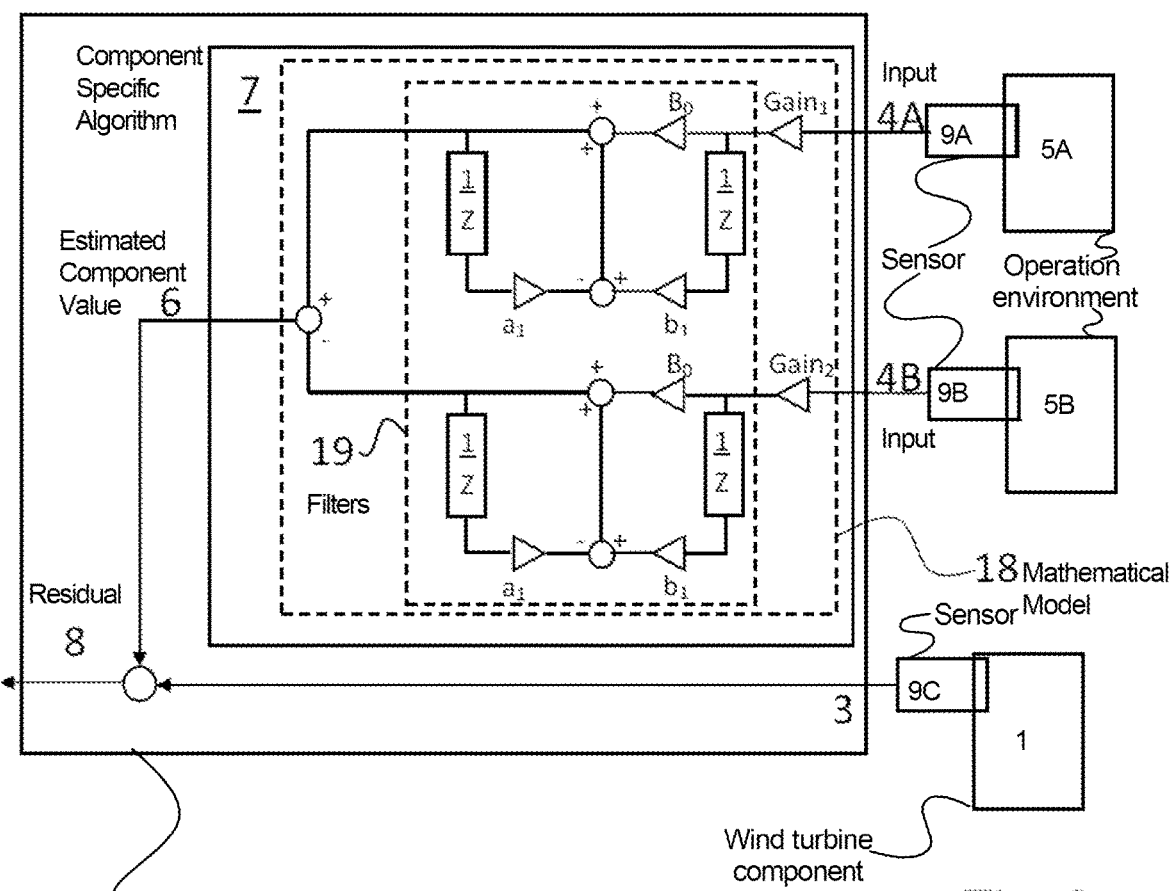
Figure 4:
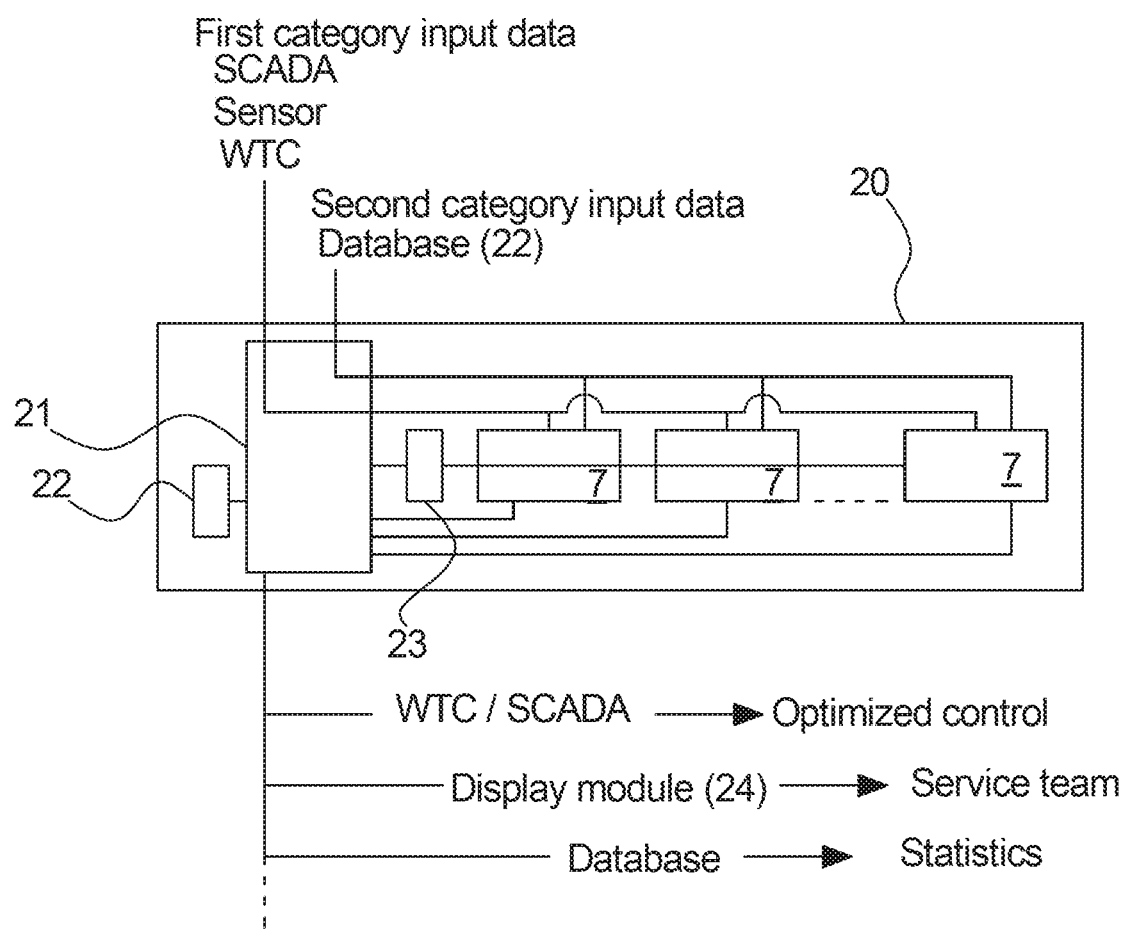
Figure 5:
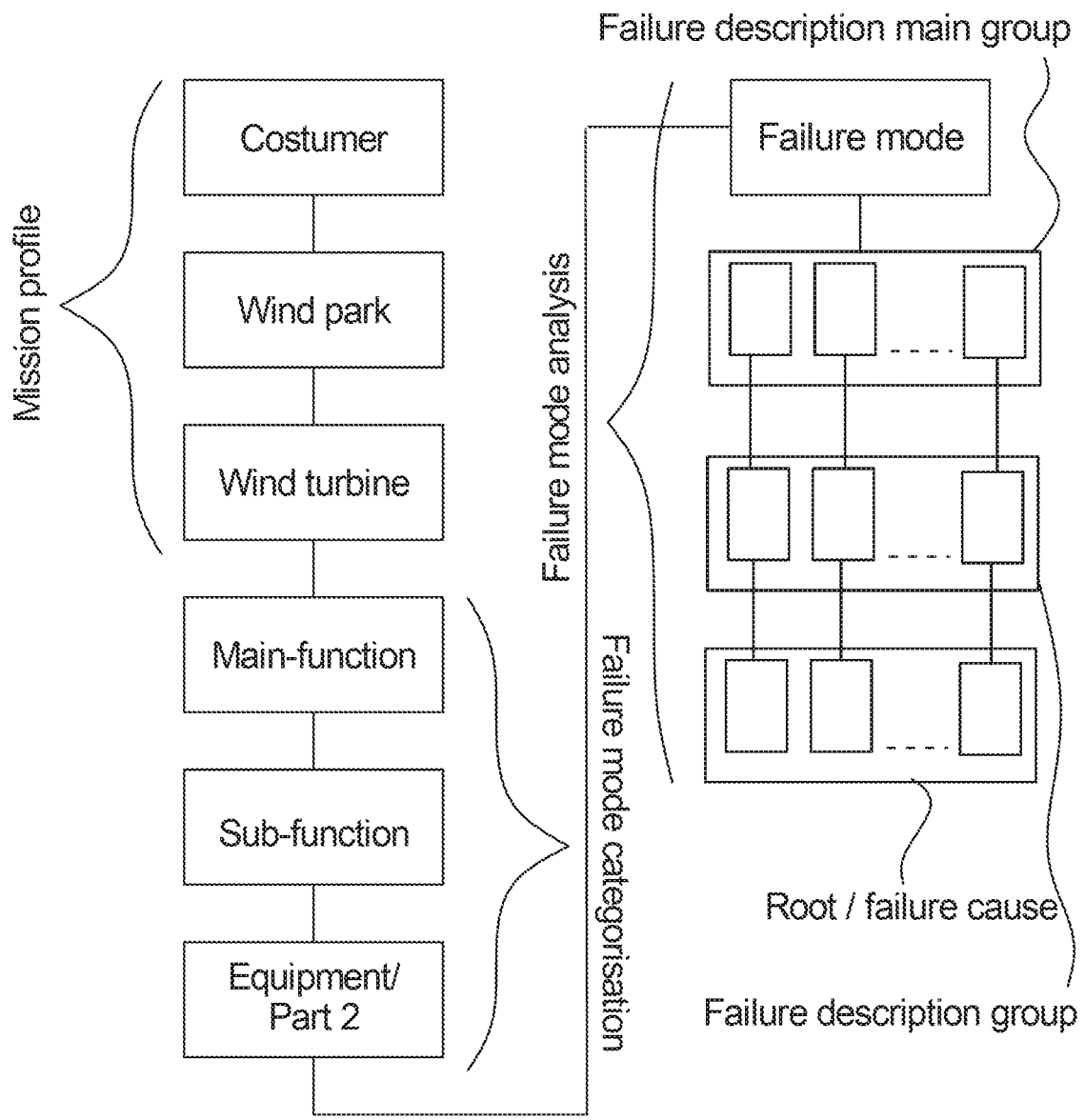
Figure 6:
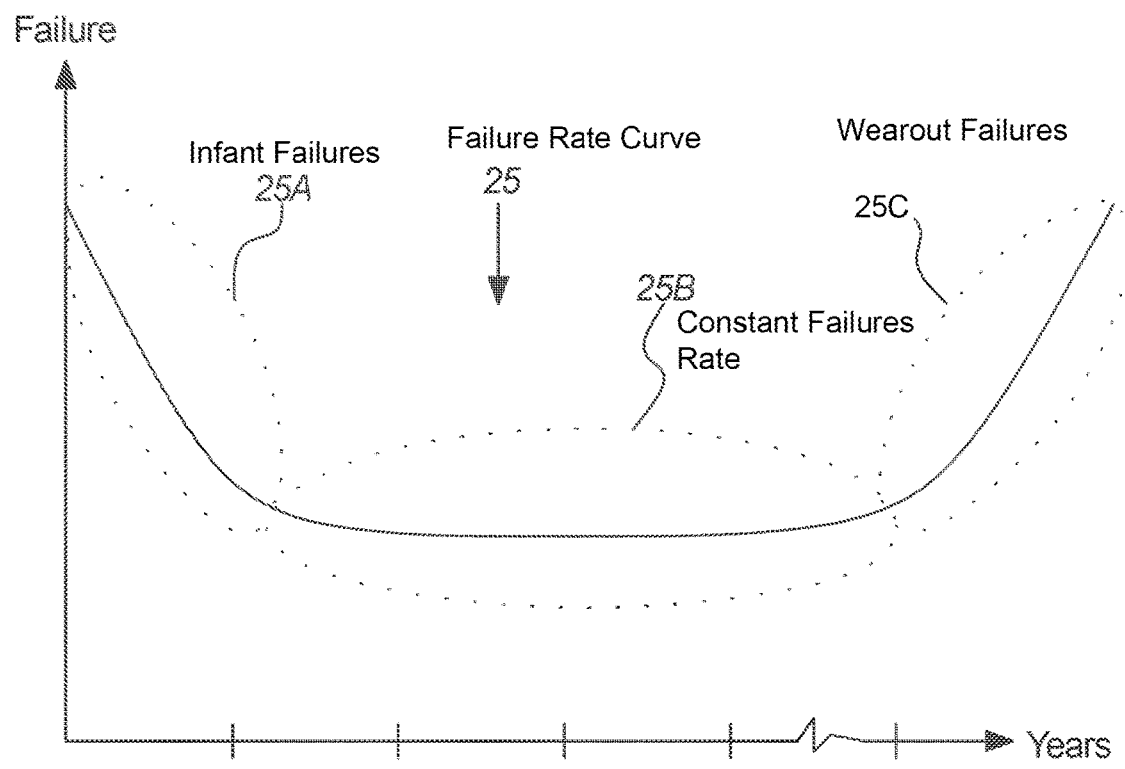
Figure 7:
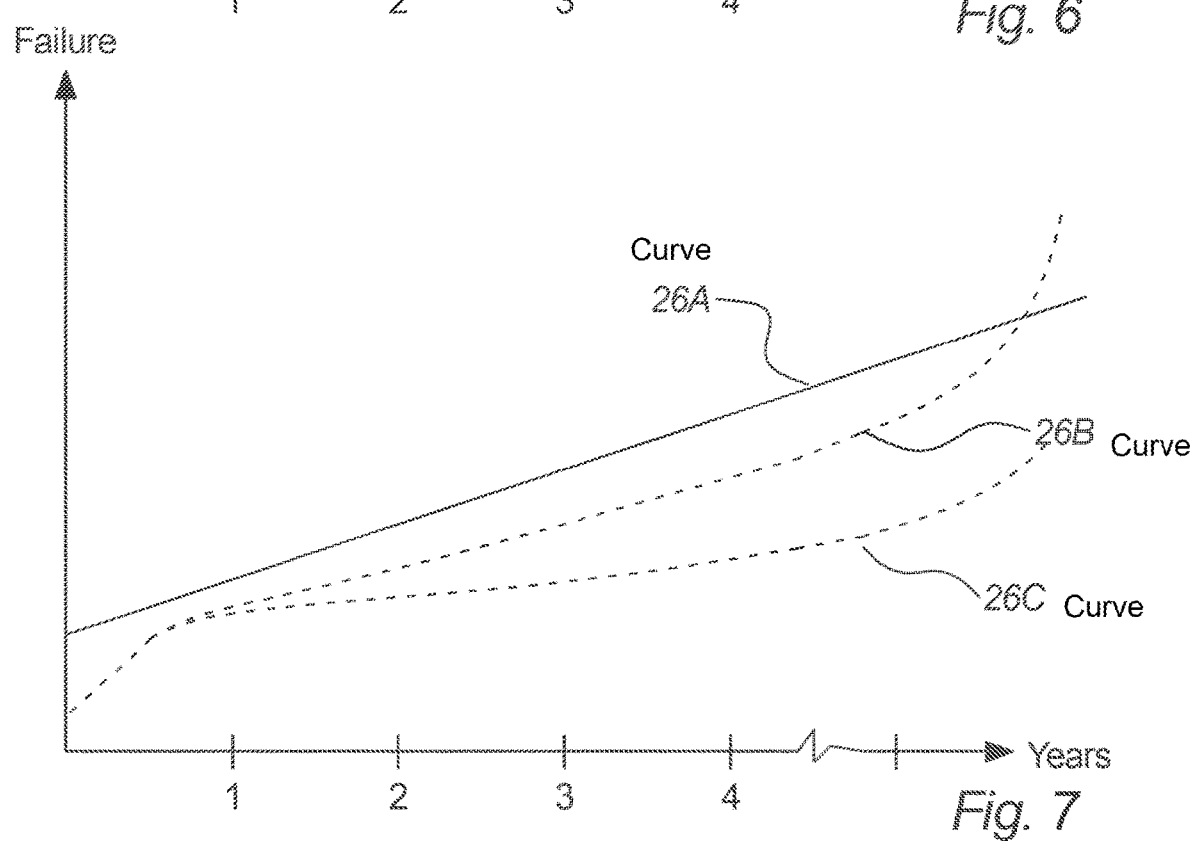

A few exemplary embodiments of the invention will be described in more detail in the following with reference to the figures, of which FIG. 1 illustrates a wind turbine according to an embodiment of the invention, FIG. 2-3 illustrates examples of how first category data input is obtained, FIG. 4 illustrates a schematic overview of the invention, FIG. 5 illustrates an example of how second category data input is obtained, and FIG. 6-7 illustrates failure rate curves.

DETAILED DESCRIPTION OF THE INVENTION

FIG. 1 illustrates a wind turbine 2 comprising a plurality of wind turbine components 1 such as wind turbine controller 10, tower 11, nacelle 12, hub 13, blades 14 and a plurality of sub-components attached to or located within the wind turbine components 1. At least part of the wind turbine components 1 are communicatively connected e.g. by means of one or more pressurized systems based on e.g. hydraulic or air, data communication network 15, electric systems, optical or mechanical connection systems. Thereby interaction between the wind turbine components 1 is obtained facilitating power production of the wind turbine 2 under various conditions which is considered common general knowledge by the skilled person and therefore not disclosed further in the description.

In FIG. 1 a few sub-components as well as the wind turbine 2, tower 11, nacelle 12, hub 13, blades 14 and communication network 15 are all denoted 5 to indicate that they all may also be referred to as operation environment 5.

Hence depending on the input needed by the component specific prediction, reliability and optimization algorithm (simply referred to as algorithm) 7 and the wind turbine component 1 to be measured, the measurements from sensors 9 may either be seen as the measured component values 3 or operation environment values 4.

FIG. 1 also illustrates a meteorology station 17 which may also be seen as both a wind turbine component 1 and an operation environment 5 but is primly used for measuring operation environment values 4.

It should be mentioned that in this description the wind turbine component 1 of which the component value 3 is measured is denoted 1 and referred to as wind turbine component. Other wind turbine components (or meteorological entities) having direct or indirect impact on the component value 3 is denoted 5 and referred to as an operation environment 5. Hence in one example e.g. a pitch motor could be denoted 1 if a component value 3 of this pitch motor is monitored. The same pitch motor could be denoted 5 if in another example e.g. the component value 3 to be measured is e.g. the load of the blade. The pitch motor has indirect impact on the load on the blade in that the pitch motor upon instructions e.g. from the wind turbine controller 10 changed the pitch angle of the blade 14 and thereby reduces or increases the load introduced from the wind on the blade 14.

Accordingly, the first category of data input may include both what is referred to as measured component values 3 and/or operation environment values 4. More details of the first and second category of input data will be found below.

FIG. 4 illustrates the independent data processing environment 20 according to an embodiment of the invention. According to this preferred embodiment, the environment 20 comprise an environment data interface 21 adapted to receive first and second category data input and perform overall processing hereof.

As will be described, the first category of data input may be received from existing sensors, sensors added to provided needed data input not accessible from existing sensors, wind turbine controllers, etc.

Further, as will be described the second category of data input may be received from a database 22 located external to the wind turbine. The database may also be part of the processing environment 20 hence second category data input may arise from the processing environment 20 itself.

The processing of data at the environment data interface 21, may be limited to averaging received data, filtering e.g. none desirable data such as outliers, transmitting/forwarding data, etc. The processing made be the environment data interface 21 is made prior to forwarding data to the one or more component specific monitoring algorithms 7 of the data processing environment 20.

Hence some of the received first and second category of data input may be processed and some may be processed before transmitted to the algorithms 7.

The input received by the environment data interface 21 may be a reading of a data input/output terminal regularly scanned by a data processor 23 of the processing environment 20 communicating with the interface 21, database 22 and algorithms 7. Alternative, the input is received from a data logger of the wind turbine or park. How first category input data is received is not essential. Scanning of the data storage, logger, terminals or where relevant data is accessible can be made with frequencies of 10 ms to 10 min as is the case with sample frequency of algorithms 7. It should be mentioned that data can also be pushed to the processing environment 20. It should be mentioned, that sample frequency of the algorithms 7 can be made with another frequency than the frequency with which input is scanned or received.

The component specific monitoring algorithms 7 are not only component specific, but also wind turbine specific. Accordingly, the algorithms 7 are developed targeting a specific component of a specific wind turbine preferably also at a specific site. This means that the first category of data input required by the algorithm 7 is communicated to/read by the data interface 21 which then according to the model algorithm defined scan time makes sure to obtain the data.

Alternatively, a plurality of predefined data is scanned and updated by the data interface 21 which then puts the data at disposal for the algorithms 7.

The output from the processing environment 20 is a component specific health value (simply referred to as health value) which is a measure of the state of the particular component which is monitored. The health value is preferably a value between 0 and 100. On a predefined (and again components specific) scale, this health value equals a components specific health status (simply referred to as health status) of the component. Preferably three health statuses exist GREEN, YELLOW and RED. Accordingly, if the health value is within the part of the scale defining a components health status GREEN, then output from the algorithm 7 is "GREEN" (or the health value determining this).

Alternative, the scale is the same for all components, but then the thresholds defining the health status of are not the same from algorithm to algorithm 7.

The output from the monitoring algorithms 7 are preferably via the data interface 21 provided to an environment monitor 24 (also referred to simply as monitor or display). The environment monitor 24 provides the overview of preferably all monitored components of the wind turbine. The health status indicates if service or maintenance is needed simply by colouring a part on the monitor 24 which is linked to the monitored component.

In addition, if the processing environment 20 or more specific the data interface 21 has access to second category data input from a database 22, additional information can be provided and displayed on the monitor 24.

Since the second category of data input include data obtained from service of the component to be monitored, by providing these data to the algorithm 7 additional information of the component can be displayed. Such additional information may be root cause of failure, spare parts needed to service the component, tools needed to service the component, etc.

This is possible in that the second category of input data is found from the same data base 22 as e.g. the service team (onsite or at laboratories where a defect component is repaired) uploads data to as described below.

From this database 22 each component to be monitored is registered with failure rate, tools, diagrams, service interval, related components, etc. As the components of the database 22 gets older, there service life, updated diagrams, failure rates updated based on experiences with similar components in similar wind turbines under similar operation conditions, etc. are updated. Most important to the algorithms 7 determination of health value/health status is the failure rated which as mentioned is updated mainly based on service team feedback.

It should be mentioned, that the failure rate may also be calculated or established from or in the processing environment 21.

Hence, when the first and second category input data is received by the algorithm 7 (preferably in real time at least for the first category) a health value is determined either based solely on the size of the component specific residual 8 (referred to simply as residual), solely based on the failure rated or on a combination of residual and failure rate.

As mentioned the residual 8, health value and health status are component specific. The health value and health status is preferably comparable among the monitored components such that when two components are having a health value of e.g. 25 they are at the same level of health (i.e. wear, lifetime, failure rate, etc.). The residual of the two components leading to the health value of the 25 is however most of the time not the same. This is because different components have different limits for operation parameters and different operation ranges.

This is the reason for the residual scale of the algorithms 7. A general scale is simply not possible to use for all components if a comparable health value should be derived. Therefore, simulations and experiences with service of components has led to development of the algorithm 7 specific for the individual components. As mentioned part of the algorithm 7 is a residual scale linking the non-comparable residual to a comparable health value.

In an embodiment of the invention, the change of the residual is monitored and also used as a parameter in establishing the health value. Hence, if the residual is constant over a plurality of samples of the algorithm, the residual and thereby a potential failure is not considered to be evolving and thereby it does not affect the health value. If the residual changes and maybe changing fast over subsequent samples this indicates that a failure is evolving and thereby it is expected that something has to be done within a short period of time. Therefore, in the latter situation, the health value is influenced by the changing residual.

As if the case with the changing residual a failure rate may also be directly reflected in the health value. Hence, if from the database 6 it is found that a particular component is failing at high frequency after 3 years of operation, this information may also change the health value to alert e.g. service personal or control that something may soon happen to component.

The health value/health status is used by service team to monitor the wind turbine/park on a monitor 24 but could also form basis for the wind turbine controllers 10 or existing SCADA systems operation of the wind turbine 2.

It should be mentioned that the processing environment 20 is dynamic in that new components can always be monitored by adding a new algorithm 7 targeting such new component.

Accordingly, by the inventive processing environment 20 it is possible to predict when a component is to be failing and either control or service the component in advance and thereby safe avoid production loss and costly unplanned service visits.

This is done based on the health value which is determine automatically by the algorithms 7 based on the first and second category input data which is always available for further analysis of the component.

The algorithms 7 are developed based on system knowledge, simulations relate to the components or the like. Hence the first category input data needed to monitor a particular component is determined based on system knowledge and/or simulations of the component or subsystem of the component.

A particular advantage of the present invention is that it is a proactive monitoring system suggesting via the health value when to act and also possibly how to act and in which way. This is in contrary to known condition monitoring systems and SCADA systems which are reactive i.e. the service team will only see the alarm when the "threshold value" is exceeded so to speak.

The algorithms 7 may e.g. be designed (built, simulated, adjusted, etc.) and implemented in the processing environment 20 via tools such as Python, Matlab™, Octave, etc. The design or training of the algorithms is build and verified by historic data, system knowledge and alarm statistics. In order to improve the algorithms, they may be adaptive also referred to as machine learning algorithms based on regression, neural networks, etc.

From FIG. 4 it is illustrated that the output of the algorithms 7 may be provided to a display monitor 24 as described above. Enables predictive maintenance in that the health value/status e.g. turns an area representing a component e.g. from green to yellow and finally to red. Thereby a failure is predicted by the yellow or red colour before it actually happens. This leads to increased availability, better planed service and avoidance of consequential errors.

The use of second category input data (e.g. field and service) enables reliability calculations of components to real Mean Time Between Failure (MTBF) (not just the MTBF from the manufacture which is usually very conservative) also leads to higher availability and better planed service. Further, costs related to keeping components on stock is reduced in that it is better predicted due to the updated MTBF value when a component is about to fail and thereby when it should be on stock.

Finally, the present invention may lead to optimised control in that individual or coordinated control of e.g. power, yaw, pitch, etc. is possible leading to an increased annual production and lower loads on the wind turbine in general.

The following is a none limiting list of components which is possible to monitor by the present invention. converter (e.g. temperature and pressure of cooling system), gear (e.g. temperature of bearings, temperature and pressure of oil, lubrication), generator (e.g. temperature of windings and bearings), hydraulic system (e.g. oil temperature), main bearing temperature, transformer (e.g. temperature of room and windings), power performance (e.g. produced kW), etc.

Above, the invention is described in relation to monitoring of wind turbines, however it should be mentioned that other systems in other industries may benefit from the present invention. Energy producing industry including use of solar, etc., transportation including trains, ships, etc. just to mention a few.

Now the monitoring algorithm 7 according to an embodiment of the invention where only first category input data is used will be explained. It should be mentioned, that the algorithm 7 described in the following embodiments may in addition be adapted to receive second input data as described elsewhere in this document. Further it should be mentioned, that an algorithm 7 may be designed specific to each of the components 1 which needs to be monitored, hence a plurality of algorithms 7 may be part of the processing environment 20.

The first category input data is preferably obtained in real-time and real-time measuring and estimation should preferably be understood as performed without undue delay as data is measured and comes in i.e. not temporary stored before measuring and/or estimation. Hence real-time estimation is carried out continuously as measured data is presented to the data processor performing the estimation. In the same way, the real-time measurements are made continuously at the wind turbine component and communicated to the data processor of the wind turbine controller. With this said, the first category input data may also be obtained from a data storage or data logger temporary or permanent storing this data.

Wind turbine controller should preferably be understood as comprising a data processor which is part of the continuously control of the wind turbine or is part of the continuously control of a plurality of wind turbines in a wind park.

A component value (also referred to as first category input date or included herein) should preferably be understood as a value related to a component of a wind turbine in terms of e.g. temperature, pressure, time since last start/stop, vibration, noise, flow, speed, current, voltage, acceleration, etc. Further a component value may also include derivable values i.e. values not measured in relation to one particular wind turbine component. Examples could be power production, power quality, humidity in the wind turbine, congestion on data network, etc.

The operation environment (also referred to as first category input date or included herein) should preferably be understood as the meteorological environment of the wind turbine and of the wind turbine component inside the wind turbine. In addition, operation environment, should preferably be understood as other wind turbine components or things related hereto which as impact on the component value. Examples hereof could be pressure of cooling fluid of a wind turbine component, noise from a wind turbine component, temperature, vibration, etc. of the wind turbine component.

Appropriate sensors such as transducers, encoders, temperature sensors, accelerometers, gyroscopes, anemometers, flow meters, etc. are chosen depending on the component value/operation environment value to be measured.

It should be mentioned that the operation environments may have either direct or indirect impact on the value of the measured component value.

According to an advantageous embodiment of the invention the modeling algorithm 7 receive inputs (also referred to as first and/or second category data input) which are compared, correlated or aggregated i.e. modeled, resulting in an estimation of a predetermined value.

Hence, according to a preferred embodiment of the invention the algorithm 7 is designed to by means of mathematical manipulation such as addition, subtraction, amplification, averaging, filtering, integration, differentiation, etc. estimate a value of a predetermined wind turbine component based on predetermined input values.

Component health (also referred to as health value or health status) should be understood as the how close the component is to be worn out i.e. current state of health and/or if a component does not work as intended i.e. fails, introduce vibrations, temperature, pressure, noise, etc. which is not considered normal for that particular wind turbine component. It should be mentioned that component here also includes the sensors for monitoring. Hence in an advantageous embodiment of the invention the method of the invention may facilitate or be part of a predictive maintenance system of wind turbines.

The mathematic manipulation performed by the modeling algorithm 7 may be done by one or more transfer function, preferably implemented as at least one first order transfer function having predetermined input values from the operation environment preferably obtained from sensor or data logger. These operation environment values are by the one or more transfer functions mathematically manipulated in terms of addition, subtraction, comparison, correlation, aggregation, averaging, division, multiplication, amplified, damping, etc. Hence in this way it is possible to estimate a predetermined component value by providing operation environment values to a modeling algorithm of the present invention.

According to an embodiment of the invention, the modeling algorithm comprises a low-pass filter or integrator.

According to an embodiment of the invention, the component value is defined by a measure selected from the list comprising: temperature, pressure, load, torque, power production, power quality, acceleration, voltage, current, flow, speed, noise, metrological values such as wind speed, wind direction, humidity, temperature and turbulence. According to an advantageous embodiment of the invention all existing values which are possible to measure of a wind turbine could be regarded as a component value.

According to an embodiment of the invention, the operation environment having at least indirect impact on the value of the measured component value is selected from the list comprising: metrological measures outside the wind turbine, metrological measures inside the wind turbine, utility grid and wind turbine components.

Operation environment should be considered the close surroundings having impact on the value of the measured component value.

According to an advantageous embodiment of the invention metrological measures comprise temperature, humidity, wind speed, wind direction, sunlight and shadow.

FIG. 2 illustrates an algorithm according to an embodiment of the invention. In step 1 the sensor 9E is measuring a component value 3 of a wind turbine component 1 and as soon as the measurement is made it is communicated to a wind turbine controller 10. This is preferably what is understood by real-time measuring and communication.

In step 2 sensors 9A-n measures different operation environment values 4A-n of a plurality of values of one or more operation environments 5A-n. These operation environments 5 could e.g. be wind turbine components 1 or values related to meteorology/environment within the wind turbine 2 or outside the wind turbine 2 having direct or indirect impact on the value of the measured component value 3. The measurements made in step 2 are as in step 1 measured and communicated to the wind turbine controller 10 in real-time.

Alternatively, the environment data interface 21 obtains the component value and operation environment value from a data storage or data logger.

In step 3 the algorithm 7 of the wind turbine controller 10 receives all operation environment values 4A-n from the sensors 9A-n obtained from the operation environments 5A-n. The algorithm 7 then estimates at least one estimated component value 6 of the at least one wind turbine component 1. Hence the estimated component value 6 could be considered as a representation of the measured component value 3. This means that at least in some situations if the sensor 9E fails the wind turbine controller 10 may continue operation of the wind turbine based on the estimated component value 6.

In step 4 the wind turbine controller 10 compares the measured component value 3 and the estimated component value 6 to obtain a residual 8. In one example, if the residual 8 is zero the estimated component value 6 has the same value as the measured component value 3 measured directly at the wind turbine component 1. In this way the wind turbine component 1 is monitored by a model based monitoring system.

In step 5 the residual 8 is used for various purposes as will be explained below.

It should be mentioned that the algorithms can be made both before and after monitoring of the wind turbine according to the present invention is initiated.

The algorithm 7 is made by selecting input values and determines how to aggregate or by means of mathematic modelling model these input values to obtain a residual 8 which is possible to compare to the parameter defined threshold value to obtain information of a wind turbine component 1. This may be done based on simulations of the component or components or sub-systems related to the component.

In the example illustrated in FIG. 2 the wind turbine component 1 of which a value 3 is monitored is an inverter modules 1 of the power converter and the measured component value 3 hereof is its temperature.

In step 1 the sensor 9E is located at the power converter facilitating monitoring of the temperature 3 of the inverter module 1.

In step 2 the sensors 9B, 9C are measuring values of the temperature 4B and the level 4C of cooling fluid in the cooling system. The sensor 9A is measuring a value of the ambient temperature 4A outside the wind turbine 2 and the sensor 9D is measuring a value of the generator such as the generator speed 4D. According to this example the temperature 4B, the level of cooling fluid 4C and the generator speed 4D could be said to have direct impact on the measured temperature 3 of the inverter module 1. The ambient temperature 4A could be said to have only indirect impact on the inverter module temperature 3 in that it only has influence on the temperature e.g. in the nacelle or panel where the inverter module 1 is located and thereby the starting temperature of the inverter module 1. It says nothing about the load of the inverter module 1.

Accordingly, examples of direct impact on the measured component value 3 may e.g. be: pitch activity has direct impact on temperature of pitch motor, wind speed has direct impact on blade root torque, leak of a hydraulic hose has direct impact on the pressure of the hydraulic system, etc.

Examples of indirect impact on the measured component value 3 may e.g. be: the wind applies to the blades 14, which makes the rotor rotate so that the wind turbine 2 generates power, thus the wind speed has an indirect impact on the active (current) power production. Likewise, ambient temperature impacts the nacelle temperature directly and thereby indirectly impacts the temperature of each wind turbine component 1 inside the nacelle 14.

In this example the operation environment 5B is the cooling system of the power converter which has direct impact on the temperature 3 of the inverter module 1 since these wind turbine components 1 are physically connected. If this cooling system 5B does not manage to keep the right temperature of the inverter module 1 this may have indirect influence on the value of e.g. the pitch angle. The pitch angle may then have to pitch the blades out of the wind to reduce power production to secure that the power converter can operate under the specified temperature conditions.

In step 3 values of the ambient temperature 4A, the temperature of the cooling fluid 4B, the level of the cooling fluid 4C and the generator speed 4D is communicated to the processor environment 20. Here it is input to an algorithm 7 where the values 4A-C are mathematically manipulated resulting in an estimate component value 6.

In step 4 the estimated component value 6 and the measured component value 3 is compared and the result of the comparison is a residual 8. In case the measured component value 3 is 75° C. and the estimated component value 6 is 65° C. the residual 8 is −10° C.

The execution of the algorithm 7 is preferably made by a data processor 23 which is independent of the wind turbine controller 10. Accordingly, the data processing environment 20 is a monitoring system executed parallel and independently to the executing of control algorithms controlling the wind turbine when the wind turbine is idling or in a (ready for) production mode.

The residual 8 is as mentioned above preferably converted into a health value which again preferably is converted into a health status. In step 5 the residual, health value or health status is used as illustrated on FIG. 4 either as input to a controller 10 for optimized control (e.g. derate until planned service), as input to a display 24 for use in predictive maintenance by a service team, for updating a database to update reliability information of the component and/or other not mentioned uses.

In embodiments of the invention the residual 8 may be compared to a parameter or component defined threshold value such as e.g. a predefined temperature level. In an example if the difference between the measured component value 3 and the estimated component value 6 exceeds a parameter defined threshold of e.g. 10° C. an alarm is set. When an alarm is active it indicates a problem which has to be further investigated. In case the problem requires e.g. a shutdown of the wind turbine 2 it might be advantageous to add a parameter defined threshold which when exceeded sets a warning e.g. at 5° C. in order for the wind turbine controller 10 to take actions preventing the residual 8 to increase further thereby preventing the shutdown.

Hence the outcome of the comparison in step 5 is preferably alarms or warnings, but could also be values which may be used in the control of the wind turbine e.g. for determining threshold values. Further, step 5 does not have to include a comparison of values in that the change of the residual 8 in itself may provide valuable information relating to the wind turbine component which is monitored.

According to a very advantageous embodiment of the invention, the health value (based on the residual 8) is used to monitor wind turbine components 1 over a period of time. In short, a residual 8 which suddenly changes more than expected may indicate a fault whereas when the residual 8 changes slowly over time it may indicate wear. Hence by a monitoring over time more details and thereby e.g. indication of root cause of the change of the residual 8 may be achieved.

As an example could be mentioned the monitoring of pressure in a hydraulic system where the following information could be derived from the change of the residual 8:
- residual 8 increases fast: a valve is malfunctioning or a sensor is defect
- residual 8 increases slow: a hose is beginning to be clogged or other which slowly over time change the pressure of system
- residual 8 decreases fast: a large leakage or burst on a hose
- residual 8 decreases slow: a smaller leakage or wear of the system such as e.g. a worn pump which pumping capacity is reduced.

In the example the limits for fast and slow will be defined by parameter settings which may vary from one system to another. In any case, slow could be changes measured over minutes, hours, days, weeks or even years depending on what is monitored whereas fast typically will be a change measured in milliseconds, seconds or minutes.

Further in the example an increase of the residual 8 is when the measured component value 3 increases more than the estimated component value 6. Likewise, a decrease of the residual 8 is when the measured component value 3 decreases more than the estimated component value 6.

FIG. 3A illustrates an example of how an algorithm 7 suitable for a hydraulic pressure residual calculation can be implemented. It should be mentioned, that this example should not be limiting to the invention in that there are different ways of design the algorithms 7. The hydraulic pressure 3 (measured component value) is measured by a sensor 9C in wind turbine component 1 such as the yaw system. In the illustrated example, the hydraulic pressure 3 is built up when a hydraulic motor is running and is temporarily decreasing if a yaw brake is activated. This is because the hydraulic oil flows from the hydraulic system into the hydraulic yaw brake, when the brake is activated. Once the brake piston is at the stop position, the pressure will start to increase again, because the pumps are continuously building up pressure.

The hydraulic pressure 3 is estimated by the algorithm 7 implemented as a mathematical model 18 with two inputs 4A, 4B (operation environment values) and one output 6 (estimated component value) which in this example is an estimate of the hydraulic pressure 3. The two inputs are digital Boolean signals indicating if the hydraulic motor 5A (operation environment) is active and if the hydraulic yaw brake 5B (operation environment) is active respectively.

Both Boolean signals are feed through individual low-pass filters 19, to model the system characteristics. Within the mathematical model 18, the output of the yaw brake low-pass filter is subtracted from the hydraulic pressure low-pass filter to generate the estimated value 6 of the hydraulic pressure. As explained above when the estimated value 6 is compared to the measured value 3 this is resulting in a residual 8.

The algorithm 7 is preferably always predefined and input hereto is also preferably always predefined. These are predefined and determined based on the wind turbine component 1/component value 3 to be monitored. The algorithm 7 and associated input may be defined external to the wind turbine 2 and uploaded to data processing environment 20 e.g. if the root cause to an error is investigated, unexpected phenomenon occur, additional information in relation to control is required e.g. for optimizing, surveillance of components 1 or sensors 9, etc. In addition, specific wind turbine components 1 may be monitored this could be relevant if it is known that such component are failing, expensive to service or replace, causes the wind turbine 2 to stop, etc. The present invention is very advantageous in relation to such predictive maintenance.

Now looking at the second category of data input i.e. the input relating to failure rate and how this is established.

According to an embodiment of the invention, a failure rate of a wind turbine part (also referred to as component) is determined. The preferred way of determining the failure rate is by a system comprising: a work order module configured for receiving failure information related to a defect (totally or partly) of the wind turbine part, and an evaluation module configured for receiving failure information from the work order module and evaluating the failure information, wherein the evaluation module 4 is further configured for determine the failure rate of the wind turbine part based on the failure information.

Failure information is information which is obtained e.g. from an analysis after a part has been replaced or repaired and thereby knowledge of the defect (e.g. cause, environment, etc.) is obtained, this knowledge is what in this document is referred to as failure information.

According to an embodiment of the invention, at least part of the failure information is post-failure information provided to the evaluation module via the work order module by a user. The present invention is advantageous in that a more reliable failure rate (which should not be confused with remaining lifetime) is determined of wind turbine parts.

The post-failure information preferably obtained by analyzing the failure in terms of environmental conditions in the wind turbine comprising the defect part, hours of operation/use of the part, load of the part during operation, function, cause, mission profile information, etc. In this way, it is possible to obtain a failure rate of the part which is closer to the failure rate experienced in a fleet of wind turbines then the failure rate provided by the manufacture of the part.

User is preferably the service technician who has been replacing or serviced the part and therefore has detailed information of the problem which caused the defect and the nature of the defect. Alternative the service technician performing the maintenance or a supporter such as an engineer performs an analysis of the circumstances of the defect and of the defect part the result of which is provided to the evaluation module preferably via a work order module. Preferably the user provides the failure information manually to the system.

A defect should be understood as something which has impact on the operation of the wind turbine i.e. preventing the wind turbine from normal operation in the long run. Typically, a defect part requires service which includes a replacement of the part by a service technician. Examples of a defect could be when a part is completely broken i.e. not fulfilling its purpose such as measuring a temperature or only partly broken e.g. suffers from periodic failures.

The present invention is advantageous in that it does not require sensors at the wind turbine to determine the site-specific failure rate. With this said, it should be mentioned that the determination of the site-specific failure rate may be more precise if the failure information includes site specific information.

According to an embodiment of the invention, the system further comprising a site information data module configured for providing site specific information related to the defect of the wind turbine part to the evaluation module, thereby facilitating providing a site-specific failure rated of the wind turbine part. This is advantageous in that the actual operating conditions of the wind turbine are used to determine the failure rate. This means that the determined failure rate is now a site-specific failure. The site information module, may also provide information of the site in general including information of the wind turbine comprising the part.

The site-specific failure rate is advantageous in that it enables/can be used as input to forecast of OM cost, availability of the wind turbine, estimations of resources consumed in relation to servicing of the wind turbine, quantifying a risk profile relating to non-production time of the wind turbine, feedback to construction and R&D departments, valuable input to spare part strategy, etc.

According to an embodiment of the invention, the evaluation module 4 is further configured for performing root cause analysis. This is advantageous in that the result of such analysis can be used to change design of the defective part, substitute the part, change service of the part, etc.

According to an embodiment of the invention, the work order module 3 is part of a maintenance management service system used for ordering wind turbine parts from a sub-supplier. A maintenance management service system is a system used to structure service of wind turbines including reporting of failure, ordering of new parts from stock or supplier, etc.

According to an embodiment of the invention, the analysis includes determine at least one abnormalities of the list of abnormalities comprising: overspeed, overload, overheating, noise, odour, smoke, discoloration, vibration, reduced power production, non-planned stop, failure to start production on demand, failure to stop production on demand, abnormal instrument reading, external pollution, internal pollution, loose items, low pressure, high pressure, low temperature and high temperature. The selected abnormality may be referred to as the failure mode of the wind turbine caused by the defect of defective part. Abnormal instrument reading could e.g. be false alarms, faulty instrument reading, etc. External pollution could e.g. be detection of leakages of hydraulic oil, lube, oil coolant, etc. Internal pollution could e.g. be detection of water, moisture, dirt within e.g. a panel located in the wind turbine.

According to an embodiment of the invention, the analysis includes determining a cause of the defect of the wind turbine part as at least one of the list of failure causes comprising: environment, grid failure, lightning, wind turbine part worn, wind turbine part broken, loose parts, corrosion, erosion, missing or wrong maintenance, human error, vibrations, fatigue, pollution, wrong material, documentation error, manufacturing error, installation error, management error, external damage, disconnection, severed wire or wrong parameter settings. Environment may e.g. be high wind, icing of blades, high humidity, etc. Pollution may e.g. be oil or water splash, dust, moisture, etc. Documentation error may e.g. be missing procedures, specifications or drawings, etc. Management error may e.g. be failure regarding planning, organizing, precision maintenance, etc.

According to an embodiment of the invention, the site information module comprise a site acquisition module configured to provide operational data related to the wind turbine parts and/or a database comprising site specific information. Such site acquisition module is preferably a SCADA system, processing environment 20 or individual sensors monitoring the wind turbine.

According to an embodiment of the invention, the operational data related to the wind turbine parts is selected from the list comprising: temperature, operating cycles, humidity and wind speed. Operation cycles are e.g. understood as number of position changes of a contact, number of hours a part has been in operation e.g. conducting current, etc.

Further, the present invention provides a probability of failure without having dedicated transducers in the wind turbine to measure e.g. heat which is an indication of an electric parts is beginning to break. This is at least partly because such transducers may be examples of electric parts which the site-specific failure rate determined by the present invention is directed towards.

The actual failure rate is the real-life failure rated experienced by service personal servicing the part in wind turbines in contrary to the part manufacture failure rate. Naturally it is the actual failure rate, referred to simply as failure rate, which is the most interesting failure rate to use in the present invention.

As additional failures are registered the failure information estimated by the estimation unit becomes more and more precise towards the actual real-life failure rate One way of obtaining information needed to perform an analysis and establish a failure rate will now be described (and illustrated on FIG. 5). This way includes to facilitate a service/maintenance/operator responsible entity to supply needed data when ordering new parts.

This is done according to an embodiment by a system comprising a work order module and an evaluation module. Further it is preferred that the system further comprise a site operation information module and a database 22.

The database 22 is preferably provided with one kind of reliability data which may include reliability models, parameter settings of the wind turbine, etc. Based on the database content, information which may be provided from the site operation information module and from the work order module is preferably by the evaluation module used to estimate or predict reliability of the wind turbine components also referred to as parts. The prediction may be at referenced conditions and/or at operating conditions. Hence, using an apparatus as described is one way of structuring retrieval of needed information.

From FIG. 5 it is seen that part of the information relates to mission profile (i.e. site, wind turbine type and costumer information), it is preferred to include the mission profile in the analysis but only information directly relate to the failed part is strictly needed to determine a failure rate.

One way of structuring obtaining information by the work order module according to an embodiment of the invention will now be described in relation to ordering new parts. A typical reason for ordering a new part is failure or wear out of the part. The structuring of information especially related to a defect of a part i.e. the failure information can be categorised in different categories. A first of these categories could be a mission profile.

Part of the information provided may be used to divide the wind turbine into sub-functions associated with main parts for the particular sub-function to work and thereby link the faulty part hereto. An example of a sub-function could be generator including main parts such as: shaft, bearing, rotor, stator, coils, etc. Another example of a sub-function could be the electrical system including at main parts such as: switchgear, cables, contactors, relays, etc. a faulty part could e.g. be one of these main parts.

In the same way sub-functions such as converter, high voltage electrical system, control system, (tower) cables, rotor, pitch, aviation light, weather station, safety systems, control system, user interface, external monitoring, hydraulic system lightning protection, UPS systems, etc. may exist, each operating based on one or more parts of the wind turbine.

Preferably, the sub-functions further could be grouped into categories including: outside nacelle, nacelle, hub, tower base and common systems. Further, it should be noted, that some sub-functions may overlap two or more groups an example hereof could be slip-rings for transferring electricity and communication between nacelle and hub. Further, it should be mentioned that some sub-functions may be present in different of these categorise. An example hereof could be safety system which may be found both in the nacelle and tower base groups.

Each of the sub-function categories may comprise from 1 to above 10 sub-functions and thereby as already indicated preferably all functions relating to operation of the wind turbine may hereby be grouped in a sub-function category. The sub-function category is advantages in that it helps to reduce subsequent options of selections when registering/analysing a fault.

The grouping of sub-functions and associated parts may of course vary from wind turbine type to wind turbine type depending on equipment of the individual turbine. This is preferably accounted for in the communication system of the present invention.

In a preferred embodiment, the communication interface of the work order module comprises a number of fields in which the user can provide the relevant information.

In an embodiment site specific information of the wind turbine may be provided by the user to the database 22 or directly to the evaluation module. Site specific information may include information of wind class of the site, high/lowland, high/low temperature site, lightning area, on/off shore, etc. which is also referred to as mission profile.

Preferably information is provided via a communication interface which is preferably part of the work order module by a user only having access to the system via the communication interface. Alternatively, the database and/or evaluation module may have their own communication interface.

In addition to the categorisation by mission profile the failure is preferably further categorised by failure mode. Failure mode refers to the type of operation error of the wind turbine at the time the part failed. Examples of failure modes could e.g. be Overspeed, Overload, Overheating, Noise, Odor, smoke and/or discoloration, Vibration, Reduced power, wind turbine stop, fail to start on demand, fail to stop on demand, abnormal instrument reading (e.g. false alarms, faulty instrument reading), External pollution (hydraulic oil, lube, oil coolant), Internal pollution (water, moisture and dirt), Loose items, etc.

Preferably the communication interface guides the user through a series of relevant field where information relating to the failure mode is entered. As an example, the user could be a service person filling out a work description of a service job performed at the wind turbine in relation to the defect part.

In addition to the categorization by mission profile and failure mode, the failure may further be categorized or described by failure description. The failure may be described according to a failure description main group and in more details in a failure description group.

Examples of failure description main groups could be failures relating to mechanical, material, control system, electric, external influences, etc. issues. Under each of the failure description main groups a more detailed description of the failure is provided in a failure description group.

It should be mentioned that for example an error of the main-function of pitch such as the sub-function pitch motor may lead to the same failure mode i.e. "no turning of blade" due to failures of different elements of the pitch motor. This is illustrated by the boxes within the failure description main group, failure description group and root/failure cause boxes of FIG. 5. The right most chain of boxes illustrates failure mode analyses of an electric fault of the pitch motor, the second chain of boxes illustrates failure mode analysis of mechanical faults of the pitch motor. Electronic or other types of failure analysis is indicated by the left most boxes.

Examples of registering failure in failure mode category and failure mode analysis hereof could be (see also FIG. 5):

Selecting Failure Description Main Group: Control System Failure

Selecting one of the following failure description group under the control system failure main group: control failure, alarms, out of adjustment, software failure, communication, control parameters, etc.

Selecting Failure Description Main Group: Electrical Failures

Selecting one of the following failure description group under the electrical failures failure main group: short circuit, no signals, no power, earth/insolation failures, loose cables/termination failures, etc.

Hence, it is the failure mode which initiates the job in the maintenance management service system in that the failure mode is what is observed by the operation responsible e.g. the wind turbine stops i.e. a consequence of the faulty part. The fault is then categorized/described by failure mode (e.g. function of the wind turbine), mission profile (e.g. location of wind turbine) as explained. The mission profile is used to see if a fault is more typical in one mission profile than in another i.e. at one location than another, one wind turbine type than another, etc.

According to an embodiment of the invention a registration of a fault as described above can be done in the steps illustrated in FIG. 5. A few examples of result of registration of a fault is found in table 1 below. It is worth noticing that what seems to be an identical fault of a temperature sensor may be caused and therefore remedied differently (cause: erosion/corrosion). Further, temperature is essential for lifetime of electric components in that an increase of 10 degrees Celsius will halved.

TABLE 1

Result of failure registration

| Failed part | Sub-function | Failure mode | Failure description main group | Failure description group | Failure cause | Failure root cause |
|---|---|---|---|---|---|---|
| Temperature sensor | Generator heating | Abnormal instrument reading | Electrical failure | Earth/isolation fault | erosion | Signal wire rubbing hole through bulkhead |
| Temperature sensor | Generator heating | Abnormal instrument reading | Electric failure | Earth/isolation fault | corrosion | Signal wire exposed to oil from a leakage |
| Coupling mechanism | HV Breaker | Failed to start on demand | Material Failure | Friction | Missing/wrong Maintenance | Lubrication was not stated in the service manual |
| Pump | Main Bearing Lubrication | Vibration | Mechanical Failure | Clearance/Alignment failure | Fatigue | Misalignment between pump and driver shaft |

Preferably, the failure description main groups and failure description groups are linked to the mission profile.

In addition to the categorization by mission profile, failure mode and failure description, the failure is preferably also described by failure causes. The failure cause is typically found when remedying the fault but may not always be found. As with the failure description, the failure cause is preferably always linked to the sub-function of the wind turbine. Examples of failure causes could be: weather (high wind, ice, etc.), grid failure, lightning, part worn or broken, loose parts, corrosion, lack of/wrong maintenance, installation error, wrong parameter settings, etc.

The failure description and the failure causes are preferably entered via the communication interface of the work order module to the database, evaluation module 4 or other not illustrated modules of the system. Typically, the user of the communication interface/work order module is a service person and almost always at least part of the information provided origins from a service technician who actually has been in the wind turbine remedying the failure.

As mentioned, the communication interface is preferably part of the work order module, but information may also be provided to the system via a not illustrated communication interfaces. The advantage of using a communication interface related to the work order module 3 is that the work order module typically is or is part of a maintenance management service system. Owners, service responsible, etc. of wind turbines typically have access to a maintenance management service system for use when communicating with supplier(s) of spare parts to their wind turbines.

It should be mentioned that a primitive embodiment of the invention may comprise a system comprising a database whereto required information is provided manually e.g. from a central location to which a person in the site of the wind turbine reports his findings.

Beside the manually provided failure and site information, site specific operation information is preferably also provided to the system/apparatus. The site-specific operation information is relevant if a site specific failure rate has to be determined. Site specific operation information may be provided (preferably automatic) to the evaluation module or database from a wind turbine controller, a SCADA system monitoring wind turbines or similar systems.

Often wind turbines are monitored by SCADA systems, so in most situations it is relatively easy to provide the site-specific operation information and thereby improve determination of the failure rate to a site-specific failure rate of a part.

An example of the principles of a preferred communication interface is a plurality of dialog boxes configured for receiving information related to a failure of a part. The order of the below described elements is not essential and may vary. However, if it is desired to let a selection preclude subsequent selection options a preferred order exists.

The configuration of the dialog boxes is not essential to the invention; hence the below examples describe only one suggestion facilitating obtaining the failure information.

First it should be mentioned that the present invention enables determining a failure rate of parts on different level such as e.g. 1) costumer level alternative region level or wind park level (defined e.g. by comparable countries, wind classes or the like). 2) wind turbine level (i.e. the specific type of wind turbine e.g. a 2,3MW Siemens turbine). 3) sub-function level (i.e. the parts/equipment of the individual wind turbine).

To improve the calculated failure rate e.g. on the sub-function level site specific operation data can be included in the calculation.

The communication interface is communicating with the database. The database 22 preferably includes very detailed information at least of the parts of the wind turbine preferably it holds information of each individual part having an item number in the wind turbine, the site of the wind turbine, the customer, service agreement related to the wind turbine, etc.

Therefore, when registering a failure, from a mission profile dialog box it may be possible to select a costumer, site, wind park and wind turbine type.

From the dialog box it may be possible to group or categories the failure. Hence from this dialog box it may be possible to select main-function, sub-function, main part and part. As selections are made the subsequent selections is preferably effected and the options are limited down to the final selection of the defective part. An example could be that due to the link to the database, when a sub-function category has been selected a limited number of sub-functions are available. Further, when a sub-function has been selected a limited number of main parts can be selected etc.

When the part has been identified a failure mode description/analysis may be made from a failure mode dialog box. If not prior then, when the failure mode description/analysis has been made, the failure can be found. Besides the failure mode described/analysis above, information of service agreement, contact information, transport, time used on the service, etc. may be entered in the failure mode dialog box. Such information is not essential to determine a failure however it may be valuable information in future investigation e.g. to be able to identify the person having entered the information. Such information e.g. contact information or information of service agreement may be automatically provided from the database.

When the failure mode has been described, a specific description of failure/root cause may be described via a failure description and cause dialog box. Based on the previously provided data from the user and/or database 22 the possible failure descriptions and causes to select are limited. Hence it is preferred that the user has to select the failure main group, failure description group and failure/root cause from a drop-down menu. The possibilities of the drop-down menu are preferably limited by the previously selected of the mission profile, failure category and failure description of dialog boxed.

It should be mentioned, that it may be possible to add information (apart from the drop-down menus) to each of the dialog boxed especially this might be relevant in the failure mode, description and causes dialog boxed.

Link between dialog boxes are preferably made so that selections made in a first box effects the selection options in a second box. Hence if e.g. electric system is chosen in a first dialog box then mechanical parts/equipment is automatically deselected and not displayed as an option to the user in the second dialog box.

The more details reported about a failure, the better determination of failure rate of parts and root cause can be made. This is beneficial e.g. for the owner of wind turbines and therefore motivation for registering failures as described above. When failure rate of a part is determined with high precision the warehouse/spare part strategy of the sub-supplier of parts can also be better. Accordingly, a precise determination of failure rate can be used by the supplier of parts to determine a spar part warehouse strategy. This again can be used to provide estimations of when a component is going to fail and thereby predict/plan service of the part/wind turbine.

A spare part strategy may also include lead time of parts hence the above-mentioned failure description is important to the wind turbine owner even though he is not in charge of spare parts in that long lead time of components may lead to limitations in production by the wind turbine.

Hence, carefully registration/description of the failure disabling the wind turbine equipment/part allows the opportunity to be able to eliminate the cause of the failure and prevent similar failures in the future.

Further, if site specific operation data is provided to the system a site-specific failure rate is possible to determine. Site specific operation data may e.g. be temperature, wind speed, humidity, time periods since last stop, lubrication, service, change of parameter or the like, vibration, noise, etc.

All in all, by gathering post-failure information as described by the present invention, the availability of the wind turbine is increased due to predictive and intelligent service of the wind turbine, costs bound in parts on stock are reduced, lead time of spare parts can be reduced, etc.

FIG. 6 illustrates an example of a typical failure rate curve 25 divided in three phases. The part 25A is referred to as infant failures also referred to as wear in failures. The infant failures are not interesting to the present invention. The part 25B is referred to as constant failures rate which are specified by the manufacture of the part as a failure rate/MTBF value. The part 25C is referred to as wearout failures and may be caused e.g. by "number" of operations i.e. e.g. a contact which has switched a defined number of times. Wearout failures may also be caused e.g. by "time" i.e. e.g. a motor has been running for a determined number of hours. The "time" and "number" failures are often described as B10 or L10 numbers. As mentioned above, the manufacture typically is conservative when estimating/calculating the constant failure rate illustrated by curve part 25B.

The curve 25 can be calculated by the following equations:

Reliability for constant failure rate (part 25B) can be calculated as follows:

$$R = e^{-\lambda * t}$$

where $$\lambda = \frac{1}{MTBF}$$

t=time or number of operations
e=mathematic constant of the natural logarithm (2,71828182 . . . )
R=reliability for constant failure rate The reliability can be used to calculate the probability of failure as follows:

$$F = 1 - e^{-\lambda \lambda * t}$$

where
F=probability of failure failure

The interesting part here is λ as it is determined by the MTBF i.e. the failure rate. Based on the information retrieved by the present invention this MTBF value is adjusted to comply with the actual number of faulty parts and thereby the described advantages of the invention can be obtained.

Reliability for wear out failure rate (part 9C) can be calculated as follows:

$$R = e^{-\left(\frac{t}{\eta}\right)^\beta}$$

where
R=reliability for wear out failure rate
t=time or number of operation
η=Scale parameter/characteristic life
β=shape factor/shape parameter (the higher shape factor the faster degradation of the component)

The theory behind these calculations are also known as the Weibull theory.

It has been experienced that it is not unusual that a manufacture specified failure rate (curve part 25B) is 20 times or higher than the real life failure rate which can be estimated as described above.

The curve 26A of FIG. 7 illustrates the manufactures estimated constant failure rate preferably based on MTBF values. Curves 26B, 26C illustrates examples of the actual failure rate e.g. based on information retrieved from service and replacement of components. Curve 26B illustrates an aggressive site e.g. high wind class where some parts may fail more frequent compared to parts in low wind class illustrated by graph 26C.

The link between the curves of FIG. 6 and FIG. 7 is the part 25A referred to as infant mortality and is the part within the first year of curves 26B and 26C. The part 25B is referred to as constant failure rate and is illustrated as curve 26A. The part 25C is referred to as wear out failures and is illustrated as the part of curves 26B and 26C increasing to the right.

This curves 26B-C can be made according to the inventive method by analysing how many of a part running in turbines, how long time they have been there and how many is returned due to failures. The curves 26B-C therefore illustrates the failure rate at present load and present temperature i.e. the overall failure rate at real life operation conditions and is thereby a general risk profile of failure of the particular part. One way of obtaining this information is to analyse claims received on the particular part and adjust the MTBF value accordingly in the equation above. Hence the present invention is especially advantageous to suppliers of part in that such claim information is available.

The present invention is advantageous in that to the above analysis of failures additional information is related to the failure and therefore it is possible to estimate a failure rate for a more specific group of failed parts. Such group may be defined e.g. by function of the wind turbine such as e.g. pitch, yaw, etc. or location of wind turbine such as wind turbine type, wind class, etc. Accordingly, the owner of only one type of wind turbines in one type of site can get type/site specific failure rate based on information not only from his own wind turbines but also other wind turbines of similar type and sites delivering data to the maintenance management service system This is advantages in that by such corrected failure rate the probability of failure is reduced compared to the manufactures failure rate. In the situation where e.g. the manufactures failure rated is wrong the probability of failure may increase. Hence maintenance can be planned and spare parts can be purchased according to the corrected failure rate which is based real specific operations rather that test specifications defined by the manufacture.

The "raw" calculated failure rate is simply a failure rate related to the specific part based on the number of known failures of that component. As mentioned the failure rate can be specified to a specific site (by adding site information as metadata) and/or operation specific (by adding operation data as metadata) and/or wind turbine type (by adding wind turbine type data as metadata) etc. The failure rate can be any combination of these specific types of failure rates.

Hence, analysis of the failure rate of a wind turbine part as described above according to the present invention enables answering the following questions: Is the product (part) reliable enough? Is the rate of failures higher than expected? Are warranty expenses accurately estimated? Will a given part comply with estimated lifetime? Where to improve reliability? How, when and where to predict future failures? How to optimize component lifetime? and so on.

From the above it is now clear that the present invention relates to a method, apparatus and system 1 for determining a failure rate preferably a site-specific failure rate and the use hereof. Further, remaining lifetime prediction, preferred spare part list, lifetime extension etc. may be derived from information provided as described above. The failure rate and site-specific failure rate found according to the present invention can be understood as an update or more accurate failure rate than the manufacture specific failure rate (MTBF). This can be used for planning service and warehouse strategy i.e. an intelligent control of the number of a part which is needed to have on stock to be sure always to have the parts needed to keep the wind turbine in operating. Intelligent is here understood as the contrary to simply having "enough" parts on stock i.e. the present invention helps to decrease the costs tied up to parts on stock.

According to the present invention, the post-failure information provided by the above categorization makes the determined failure rate very reliable in fact more reliably as more parts have been registered (i.e. defect, replaced, maintained, etc.). The site-specific failure rate is very advantageous to managers of service of a fleet of wind turbines located in similar sites. This is because when a first wind park having type 1 wind turbines with a defect component it is possible, based on the above described analysis of the failure leading to the defect part, to determine when or at least make a qualified guess on when the same component will fail in the other type 1 wind turbines of the first wind park. This information may also be used for predicting when failure of the part can be expected in type 1 wind turbines in sites or parks similar to the first wind park.

Integrating the work order module in a maintenance management service system is advantageous in that when a new part is ordered this is done by a user and it is easy for him to add the failure information in one system compared to using one system for ordering and one for reporting failure.

The description related to estimating or updating a failure rate to determine an actual failure rate and thereby a more reliable estimation on when a component is in risk of failure has now been disclosed. It should be mentioned that the above can be modified and still be within the scope of the present invention.

LIST OF REFERENCE NUMBERS

1. Wind turbine component
2. Wind turbine
3. Measured component value
4. Operation environment value
5. Operation environment
6. Estimated component value
7. Component specific prediction, reliability and optimisation algorithm
8. Residual
9. Sensor
10. Wind turbine controller
11. Tower
12. Nacelle
13. Hub
14. Blades
15. Communication network
16.
17. Meteorology station
18. Mathematic model
19. Low-pass filter
20. Independent data processing environment
21. Environment data interface
22. Data base
23. Data processor
24. Environment monitor
25. Failure rate curve
26A. Manufactures estimated constant failure rate
26B, C. actual failure rate

The invention claimed is:

1. A system for monitoring of wind turbine components, wherein the system comprises:
 a data processing environment external to a wind turbine; and
 a wind turbine component to communicate with a data processor of the wind turbine, wherein the data processing environment is adapted to:
receive, using an environment data interface, sensor data that are monitoring components of the wind turbine,
process the received sensor data using one or more component specific monitoring algorithms which have been developed at least partly based on results of simulation of the wind turbine components to be monitored,
wherein the one or more component specific monitoring algorithms estimates a component value related to one of the wind turbine components to be monitored based on received sensor data having at least indirectly an impact on the component, wherein the estimated component value refers to an estimated value of one of the parameters associated with the component,
wherein the one or more component specific monitoring algorithms estimates a component residual as the difference between the estimated component value and received sensor data of the one of the wind turbine components to be monitored, and
wherein the one or more component specific monitoring algorithms estimates a component specific health value of the one of the wind turbine components to be monitored based on the estimated component residual, and
the environment data interface communicates the estimated component specific health value to the data processor of the wind turbine, a monitoring system, and/or a data storage system, wherein
the environment data interface receives a failure rate of the one of the wind turbine components to be monitored, and
the one or more component specific monitoring algorithms updates the component specific health value based on the received failure rate and the estimated component specific health value.

2. The system according to claim 1, wherein the weight of the received failure rate information is dynamic so that if a pattern in the received sensor data is recognised as a pattern that has previously lead to derate or shut down of the wind turbine, the updated component specific health value value is determined solely based on the received failure rate information.

3. The system according to claim 1, wherein the updated component specific health value is determined solely based on the received failure rate information if from the received failure rate information it is estimated that based on comparison with the received sensor data, the failure rate of the wind turbine component to be monitored is 50% or above.

4. The system according to claim 1, wherein the one or more component specific monitoring algorithms comprises a component specific residual scale established based on the results of the simulations of the wind turbine components to be monitored or based on historic data acquired relating to the wind turbine components to be monitored.

5. The system according to claim 1, wherein the component specific health value is established by comparing the residual to a component specific residual scale.

6. The system according to claim 1, wherein the estimated component specific health value is decreased if the residual changes between a plurality of executions of the one or more component specific monitoring algorithms.

7. The system according to claim 1, wherein the estimated component specific health value of the wind turbine component is converted to a health status of the wind turbine component wherein the health status is established based on a plurality of sub-ranges in the range of possible health values of the wind turbine component.

8. The system according to claim 1, wherein the estimated component specific health value is a value in the range between X-X and X/1, wherein immediate action is required if the estimated component specific health value is in the sub-range of X-X and X/4, wherein action is required if the estimated component specific health value is in the sub-range of X/4 and X/2, and wherein no action is required if the estimated component specific health value is in the sub-range of X/2 and X/1.

9. The system according to claim 1, wherein the data processing environment operates parallel to and independent of existing monitoring and control systems of the wind turbine.

10. The system according to claim 1, wherein the data processing environment is a cloud based environment.

11. The system according to claim 1, wherein algorithms of the environment data interface and the one or more component specific monitoring algorithms are executed by the same data processor.

12. The system according to claim 1, wherein the environment data interface facilitates communication of the estimated component specific health value, component specific health status or alarms established based on the estimated component specific health value to a data receiver external to the data processing environment.

13. The system according to claim 1, wherein the environment data interface facilitates providing control input to the data processor dependent on the component specific health status.

14. The system according to claim 1, wherein the sensor data is received from existing sensors of the wind turbine or from retrofitted sensors.

15. The system according to claim 1, wherein one or more data input of the received sensor data is used for establishing one other data input of the received sensor data.

16. The system according to claim 1, wherein the received failure rate information is obtained from a database located on an external data storage.

17. The system according to claim 1, wherein the estimated component residual is input to the data processor of the wind turbine for optimized control, and to a display for use in predictive maintenance and for updating in a database, reliability information of the one of the wind turbine components to be monitored or any combination thereof.

18. A method of estimating a health value for a specific wind turbine component, the method comprising the steps of:
by a data processing environment external to a wind turbine and the wind turbine component communicating with a data processor of the wind turbine to:
receive, from an environment data interface of the data processing environment, sensor data that monitors components of the wind turbine, and
process the received sensor data by one or more component specific monitoring algorithms, the one or more component specific monitoring algorithms having been developed at least partly based on results of simulation of the wind turbine components to be monitored, wherein the one or more component specific monitoring algorithm is configured to:
estimate a component value related to one of the wind turbine components to be monitored based on received sensor data having at least indirectly an impact on the wind turbine component, wherein the estimated component value refers to an estimated value of one of the parameters associated with the component, estimate a component residual as the difference between the estimated component value and received sensor data of the wind turbine component, and wherein the one or more component specific monitoring algorithms estimates a component specific health value of the wind turbine component based on the estimated component residual, the environment data interface communicates the estimated component specific health value to the data processor of the wind turbine, a monitoring system, and/or a data storage system, the environment data interface receives a failure rate of the one of the wind turbine components to be monitored, and the one or more component specific monitoring algorithms updates the component specific health value based on the received failure rate and the estimated component specific health value.

\* \* \* \* \*

UNITED STATES PATENT AND TRADEMARK OFFICE
CERTIFICATE OF CORRECTION

PATENT NO. : 11,549,491 B2
APPLICATION NO. : 16/618963
DATED : January 10, 2023
INVENTOR(S) : Chris Damgaard It is certified that error appears in the above-identified patent and that said Letters Patent is hereby corrected as shown below:

In the Specification

Column 24, Line 30, "$F=1-e-\lambda\lambda*t$" should read -- $F=1-e-\lambda*t$ --

Signed and Sealed this
Thirty-first Day of October, 2023

Katherine Kelly Vidal
*Director of the United States Patent and Trademark Office*